United States Patent [19]
Hirasawa et al.

[11] Patent Number: 5,630,638
[45] Date of Patent: May 20, 1997

[54] SEAT LIFT MECHANISM FOR AN AUTOMOTIVE VEHICLE

[75] Inventors: Kazuhiro Hirasawa, Toyota; Shigeru Yamaki, Ageo, both of Japan

[73] Assignees: Wako Kogyo Kabushiki Kaisha, Gumma-ken; Araco Kabushiki Kaisha, Aichi-ken, both of Japan

[21] Appl. No.: 698,183

[22] Filed: Aug. 15, 1996

Related U.S. Application Data

[63] Continuation of Ser. No. 325,903, Oct. 19, 1994, abandoned.

[51] Int. Cl.⁶ .................................................. B60N 2/14
[52] U.S. Cl. ........................ 296/65.1; 297/344.13; 297/344.16; 297/344.24; 414/549; 414/550
[58] Field of Search ............................ 248/419, 421; 296/65.1; 297/344.13, 344.15, 344.16, 344.17, 344.24; 414/549, 550

[56] References Cited

U.S. PATENT DOCUMENTS

| | | | |
|---|---|---|---|
| 2,864,431 | 12/1958 | Easton | 296/65.1 X |
| 3,236,556 | 2/1966 | Lathers | 296/65.1 |
| 4,155,587 | 5/1979 | Mitchell | 296/65.1 |
| 5,524,952 | 6/1996 | Czech et al. | 296/65.1 |

FOREIGN PATENT DOCUMENTS

| | | | |
|---|---|---|---|
| 2915259 | 10/1980 | Germany | 248/421 |

*Primary Examiner*—Andrew C. Pike
*Attorney, Agent, or Firm*—Hazel & Thomas, P.C.

[57] ABSTRACT

A seat lift mechanism in an automotive vehicle incorporates a swivel base mounted on a stationary base secured to a compartment floor of the vehicle for rotation about a vertical axis so as to be moved between a forward-facing position where the front side of the swivel base is oriented to the front of the vehicle, and a sideways position where the front side of the swivel base is opposed to a side door opening of the vehicle. A frame is supported on the swivel base for rotation therewith and a lift rack provided thereon with a passenger seat is mounted on the frame. The lift rack is connected to the frame by means of a link mechanism in such a manner that when the swivel base is retained in the sideways position, the lift rack and seat are movable from a first position on the frame to a second position close to the ground where the seating surface of the seat is maintained at an inclined angle. An actuator is combined with the link mechanism to reciprocate the lift rack and seat between the first and second positions. With the seat lift mechanism, the seat can be moved out of the door opening and lowered to the position adjacent to the ground. Thus, an aged or handicapped person can easily sit on the seat or stand up therefrom, and get in or out of the vehicle without any difficulty.

2 Claims, 7 Drawing Sheets

SEAT LIFT MECHANISM FOR AN AUTOMOTIVE VEHICLE

This application is a continuation of application Ser. No. 08/325,903 filed Oct. 19, 1994, now abandoned.

BACKGROUND OF THE INVENTION

The present invention relates to a seat lift mechanism in an automotive vehicle such as a passenger car, which lift mechanism is constructed to move a passenger seat from a usual position in the passenger compartment to and from an outside position adjacent the ground.

In an automotive vehicle, such as a passenger car, the compartment floor is placed at a high position from the ground, and it is difficult for an aged or handicapped person to get in and out of the vehicle compartment. To solve such a problem, various kinds of lift mechanisms have been proposed, wherein a lift step is mounted on a vehicle body structure in such a manner that where a user sat in a wheelchair or stood on the lift step for getting into or out of the vehicle compartment, the lift step is lifted up to the height of the compartment floor from a lower or ground position.

The lift mechanisms of the prior art are disadvantageous in that the user has to move within the vehicle compartment, both in order to sit on a passenger seat after being lifted and again in order to use the lift mechanism when he wishes to get out of the vehicle compartment. In addition, the conventional lift mechanism occupies a space in the vehicle compartment despite being used only when the handicapped or aged user gets in or out of the vehicle compartment. This results in reduction of space for other passengers and/or cargo space in the vehicle compartment. Furthermore, in the case where the user sits in a wheelchair after being lifted into the vehicle compartment, locking means must be provided in order to retain the wheelchair in place within the vehicle. In such a case, utility of the automotive vehicle is limited, and the user may not sit on the same seat as others. Such a situation is unpleasant for a handicapped person.

SUMMARY OF THE INVENTION

An object of the present invention is, therefore, directed to making a passenger seat itself movable between a usual position in the vehicle compartment and a position adjacent the ground outside the vehicle compartment and to make movement of the user in the vehicle compartment unnecessary for enhancing convenience when used for a handicapped person.

Another object of the present invention is directed to providing a lift mechanism, combined with a passenger seat as a unit thereby, to reduce space for installation of the lift mechanism and minimize reduction of space for other passengers and/or cargo space in the vehicles compartment.

A further object of the present invention is to afford a pleasant environment for a handicapped person in such manner that he can sit on a passenger seat as well as other passengers.

Other objects, features, and advantages of the present invention will become apparent from the description of a preferred embodiment thereof when taken together with the accompanying drawings.

According to the present invention, the foregoing objects are accomplished by providing a seat lift mechanism in an automotive vehicle, which comprises a stationary base secured to a compartment floor of the vehicle, a swivel base mounted on the stationary base for rotation about a vertical axis and movable between a forward-facing position where the front side of the swivel base is oriented to the front of the vehicle and a sideways position where the front side of the swivel base is opposite to a side door opening of the vehicle, a frame mounted on the swivel base for rotation therewith, a lift rack provided thereon with a passenger seat and mounted on the frame for rotation therewith, a link mechanism connecting said lift rack to the frame in such a manner that the lift rack and the seat are moved through the door opening between a first position on the frame and a second position adjacent to the ground in a condition where the swivel base is placed at the sideways position, and an actuator assembled with the link mechanism to reciprocate the lift rack between the first and second positions.

In a preferred embodiment, the link mechanism comprises a first link supported on the frame at one end thereof for rotary motion about a first lateral axis and connected to the lift rack at the other end thereof for rotary motion about a second lateral axis in parallel with the first axis and a second link of the same length as the first link, the second link being supported on the frame at one end thereof for rotary motion about a third lateral axis spaced from the first lateral axis in parallel therewith and connected to the lift rack at the other end thereof for rotary motion about a fourth lateral axis spaced from the second lateral axis in parallel therewith.

It is also preferable that the frame is slidably mounted on the swivel base in a direction toward the front side of the swivel base.

BRIEF DESCRIPTION OF THE DRAWINGS

In the accompanying drawings.

DESCRIPTION OF THE PREFERRED EMBODIMENT

Figure 4:
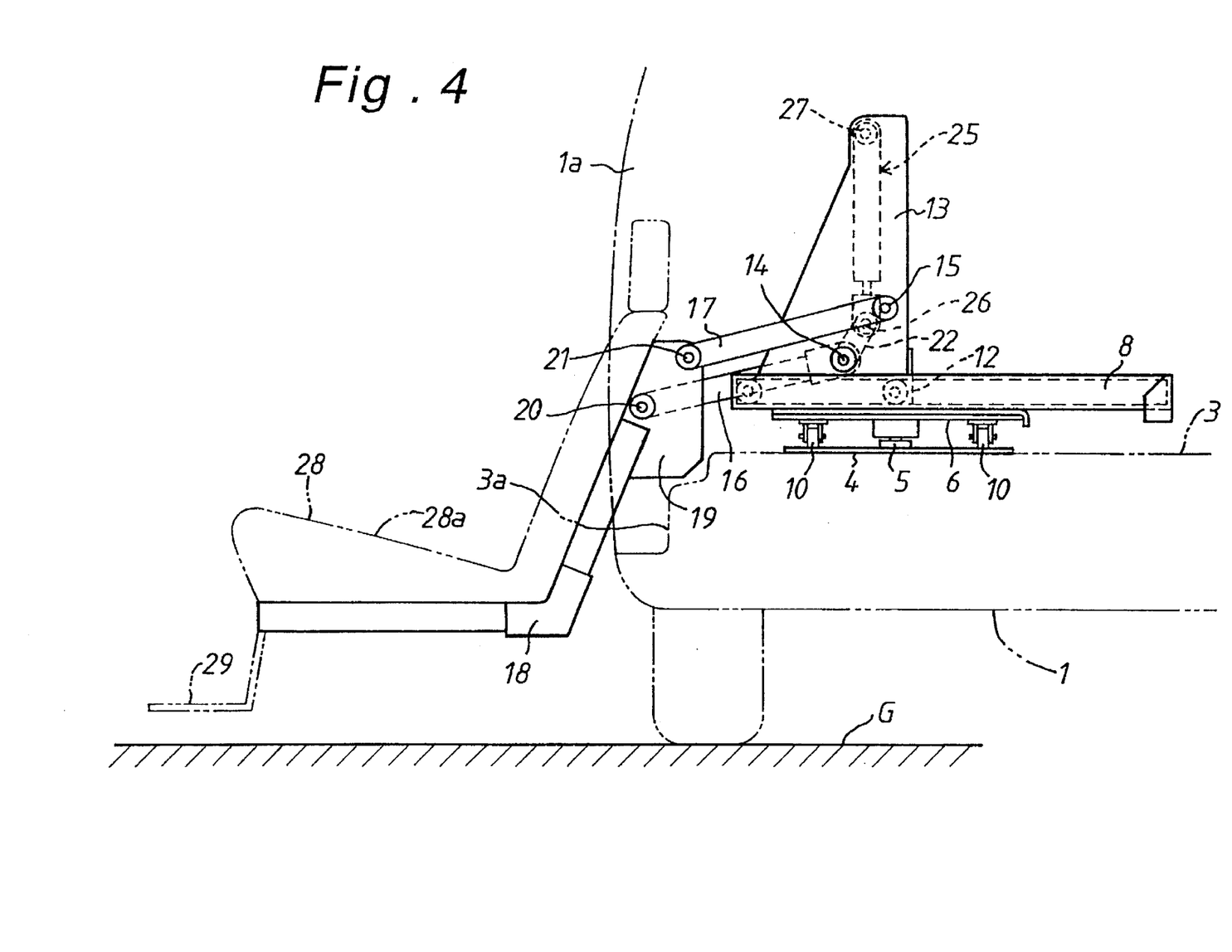
FIG. 4 is a view illustrating the passenger seat moved out of the vehicle compartment and placed at an outside lower position.
Figure 5:
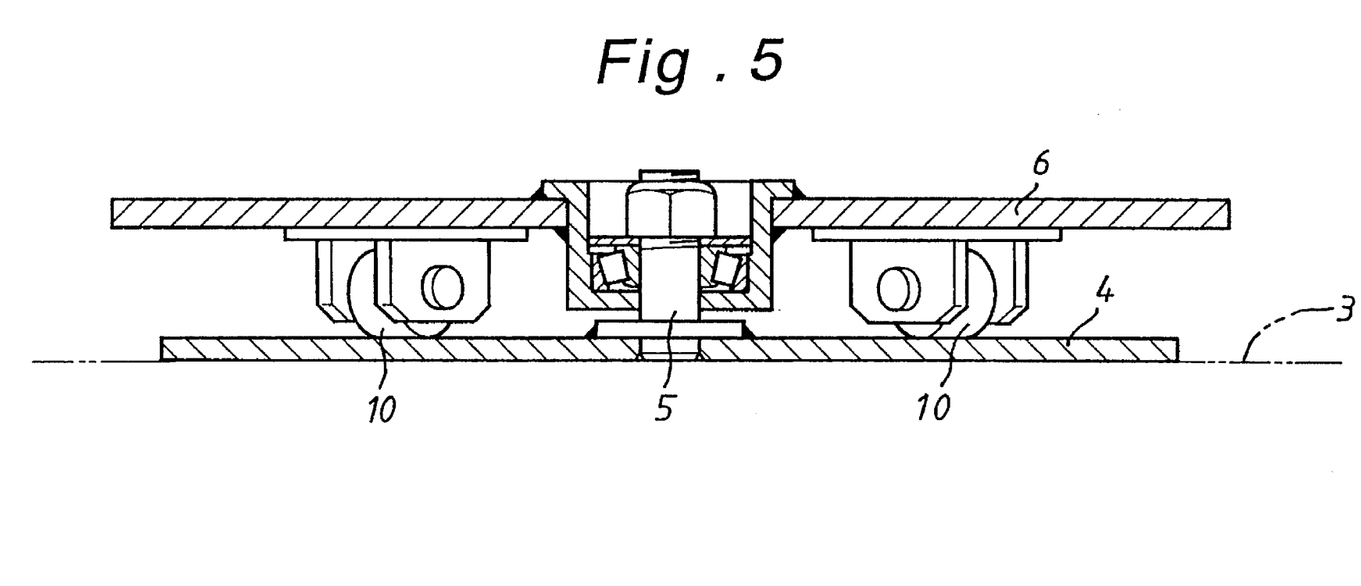
FIG. 5 is a sectional view taken along a line 5—5 as shown in FIG. 2 of the pivot mechanism for the swivel base in FIG. 1.
Figure 8:
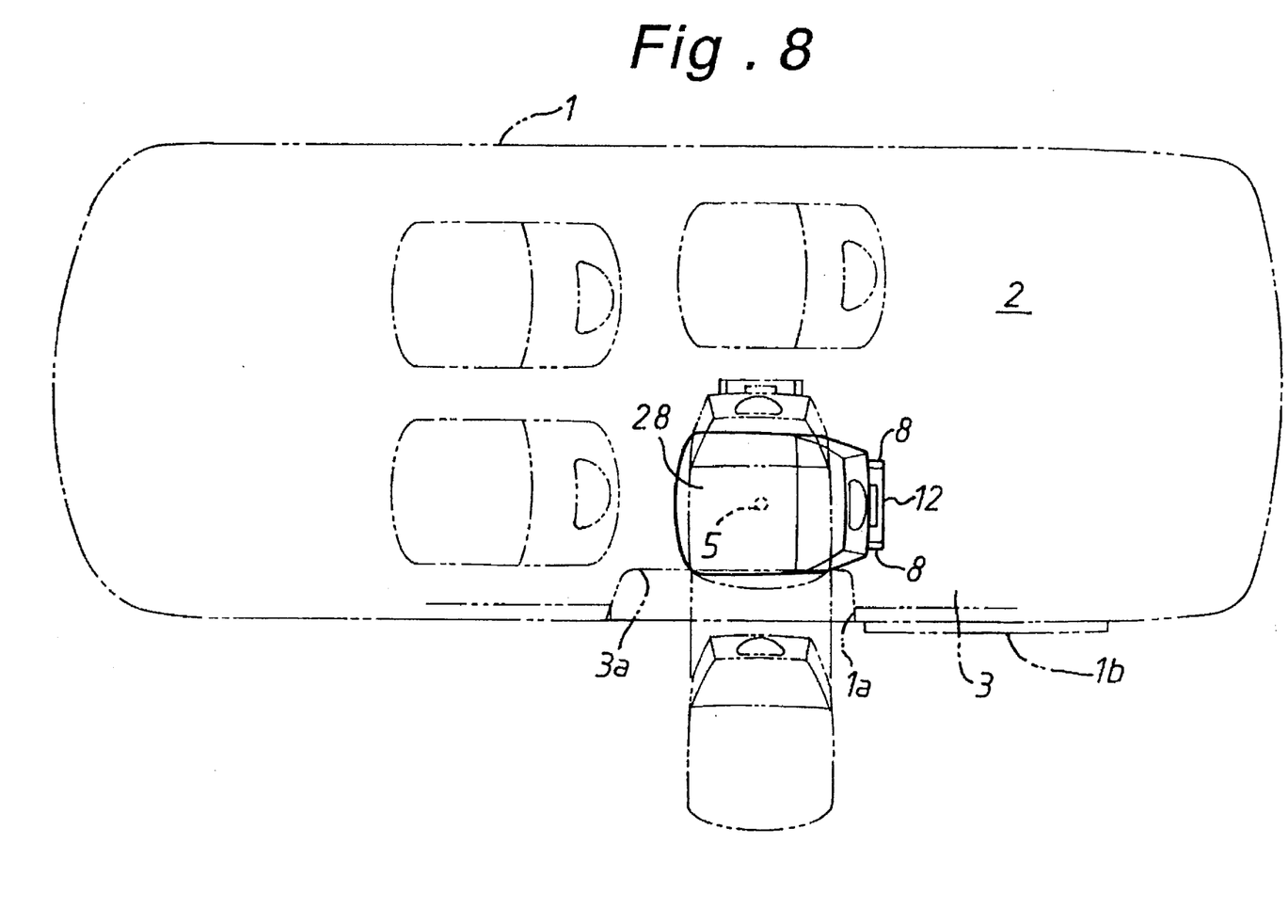
FIG. 8 is a plan view illustrating a passenger vehicle equipped with the seat lift mechanism.

Hereinafter, a preferred embodiment of the present invention will be described with reference to the accompanying drawings, wherein like reference numerals represent like parts. FIG. 8 illustrates a passenger vehicle equipped with two seats each at the front and rear portions in the passenger compartment, wherein the left-hand rear seat 28 is mounted on a seat lift mechanism according to the present invention. The rear seat 28 is rotatable between a forward-facing position shown by solid lines and a sideways position shown by two-dots and dash lines. When placed at the sideways position, the rear seat 28 is moved out of the passenger compartment through a door opening 1a of the vehicle 1 to be placed at a first position on a slide frame 12 and lowered from the first position to a second position adjacent to the ground G, as shown in FIGS. 4 and 8.

As shown in FIGS. 1–4, the seat lift mechanism has a stationary base 4 secured to a floor 3 of the passenger compartment 2 of the vehicle 1 and a swivel base 6 mounted on the stationary base 4 for rotary movement. The slide frame 12 is mounted on the swivel base 6 for horizontal movement in a predetermined distance toward the front side of the swivel base 6, and the rear seat 28 is mounted on a lift rack 18 which is connected with the slide frame 12 by means of a link mechanism composed of first and second links 16, 17. The lift rack 18 is supported on the slide frame 12 so as to be movable between the first position on the slide frame 12 and the second position adjacent the ground G, wherein the seating surface 28a of rear seat 28 is maintained at a constant angle. The movement of the lift rack 18 is effected by an actuator 25 connected to the first link 16.

Hereinafter, the structure of each of the component parts will be described. As shown in FIGS. 1–5, the stationary base 4 is secured to the floor 3 of the passenger compartment 2 of the vehicle 1, and a vertical pivot shaft 5 is fixed to the center of the stationary base 4. The swivel base 6, supporting thereon the lift rack 18 and seat 28, pivots on the vertical shaft 5 so as to be rotatable between the forward-facing position where the front sides of the lift rack 18 and seat 28 are placed in a forward direction relative to the vehicle, and the sideways position where the front sides of the lift rack 18 and seat 28 are placed in a lateral direction relative to the vehicle. In the sideways position, the lift rack 18 and seat 28 are opposed to the door opening 1a which is opened and closed by a side door 1b. Four support rollers 10 are carried by brackets pivoted to the bottom of swivel base 6 to be rotatable about each radial axis extending from the pivot shaft 5. When the swivel base 6 rotates about the pivot axis 5, the rollers 10 rotate on the stationary base 4 and support a load applied to the swivel base 6.

Figure 1:
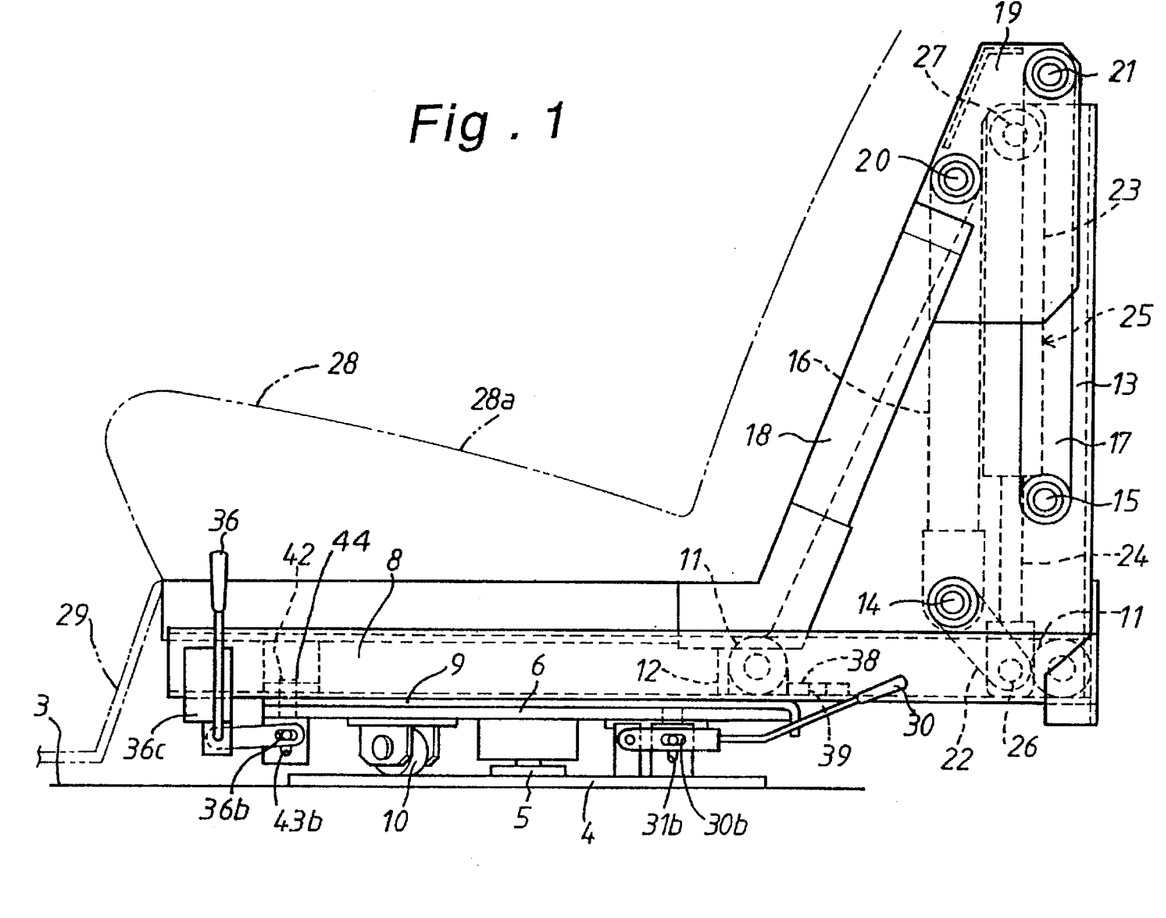
FIG. 1 is a side view of one embodiment of a seat lift mechanism in an automotive vehicle according to the present invention.
Figure 2:
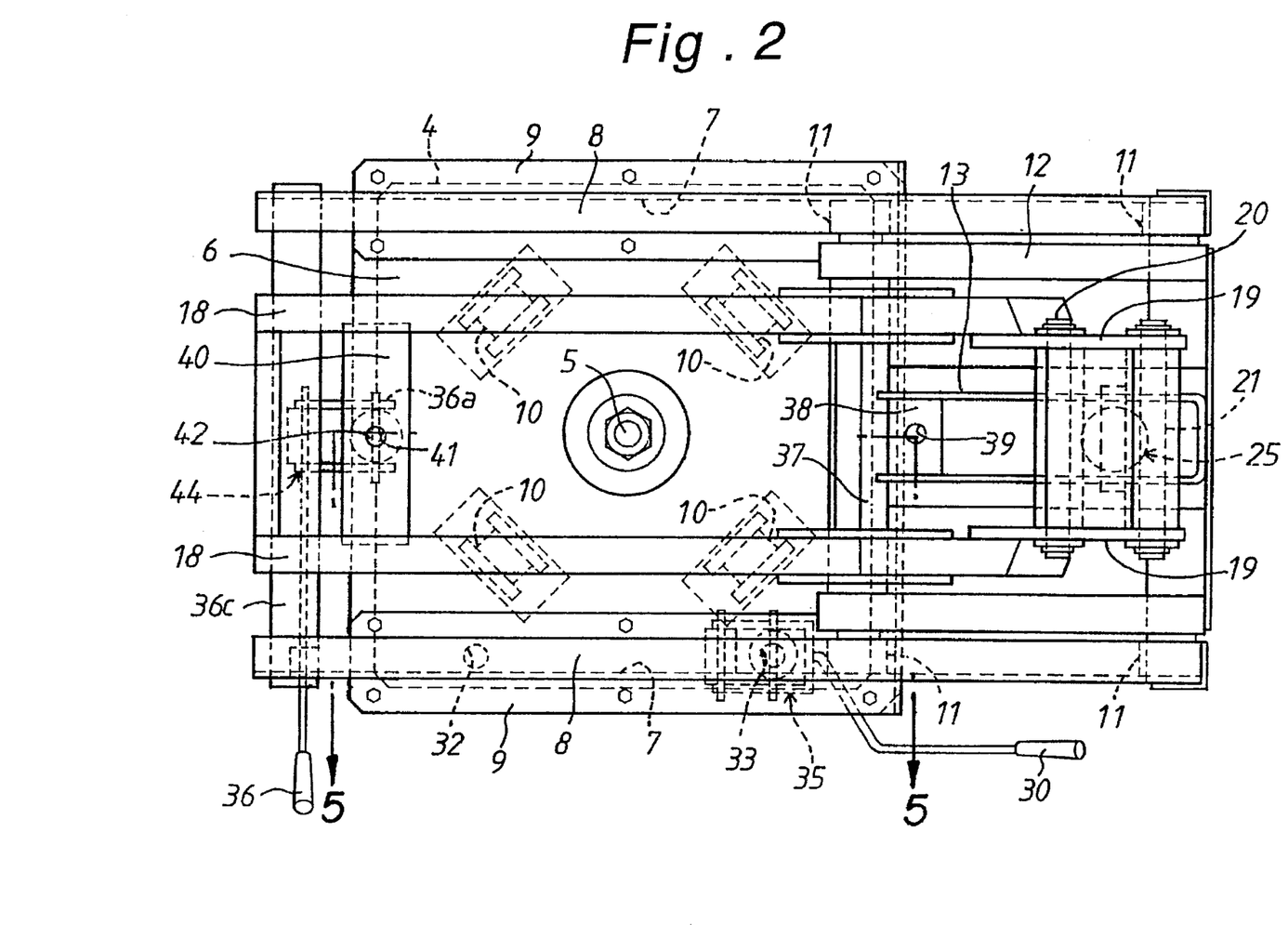
FIG. 2 is a plan view of the seat lift mechanism in a condition where a passenger seat has been removed therefrom.
Figure 6:
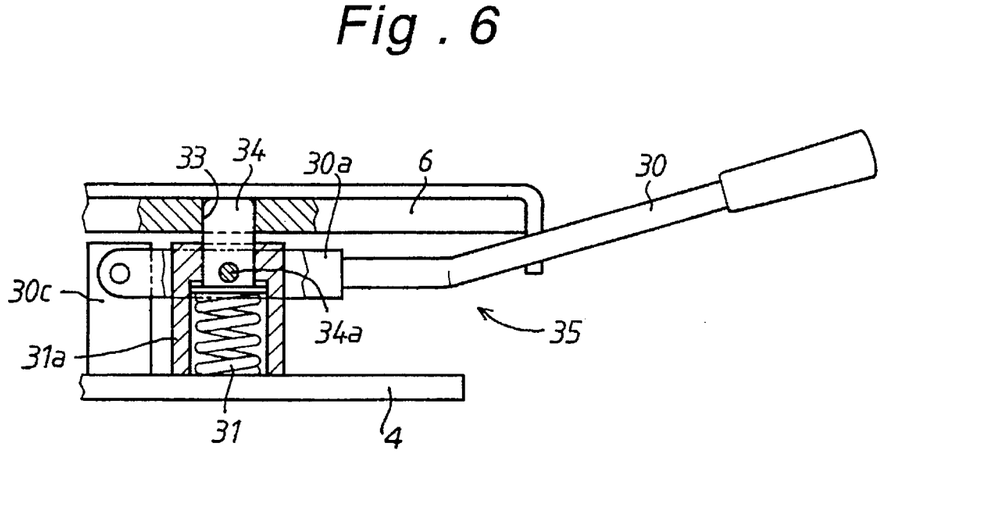
FIG. 6 is a partly broken side view of a locking mechanism for locking the swivel base to the stationary base at a forward-facing position and a sideways position.

In FIGS. 1, 2, and 6, there is illustrated a locking mechanism 35 for locking the swivel base 6 at the forward-facing position and the sideways position. A lock pin 34 of the locking mechanism 35 is vertically and slidably disposed within a cylindrical holder 31a secured to the stationary base 4 and loaded upwardly by a spring 31. In a free condition, the lock pin 34 is engaged at its lower end flange with an upper flange of the holder 31a and projected from the upper surface of holder 31a at its upper end. A release lever 30 of the lock mechanism 35 is provided at its distal end with a U-letter shaped fork portion 30a, which is pivoted to a support block 30c secured to the stationary base at a position adjacent the holder 31a to be rotatable about a lateral axis. A connecting pin 34a crossing the lock pin 34 is engaged at its opposite ends with elongated holes 30b formed in the fork portion 30a, through elongated holes 31b formed in the holder 31a. When the release lever 30 is pushed downward, the lock pin 34 is moved downward against the biasing force of spring 31.

As shown in FIG. 2, the swivel base 6 is formed with two angularly spaced holes 32, 33 engageable with the lock pin 34. When the swivel base 6 is rotated, the lock pin 34 is selectively engaged with the holes 32, 33 to retain the swivel base 6 in the forward-facing position or the sideways position. Although in this embodiment, the swivel base 6 is manually rotated about the pivot axis 5, a power mechanism using a sector gear and a pinion or a crank and a connecting rod may be adapted to rotate the swivel base 6 between the forward-facing position and the sideways position. In such a case, the locking mechanism may be eliminated.

Figure 3:
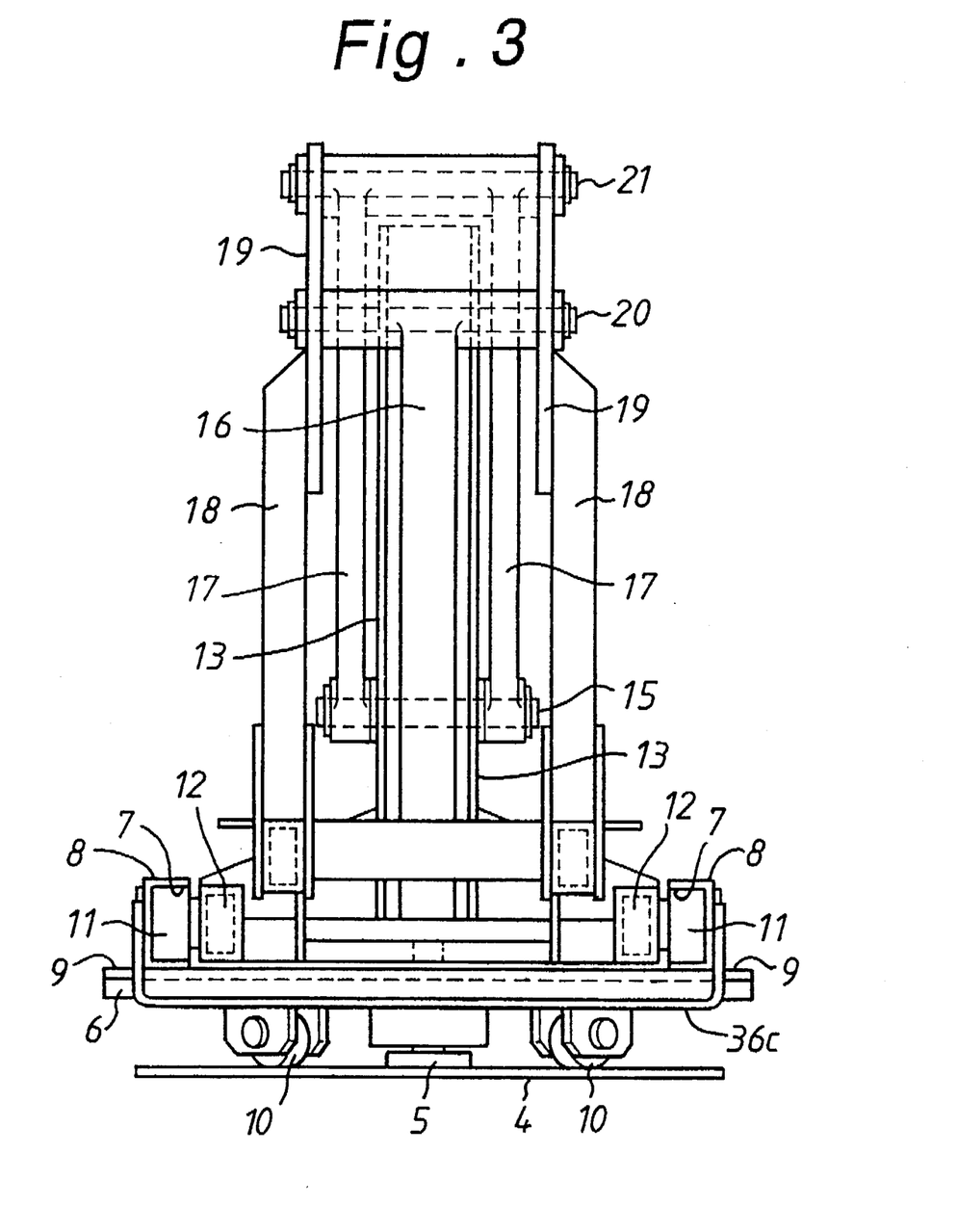
FIG. 3 is a front view of the seat lift mechanism in a condition where the passenger seat has been removed therefrom.

As shown mainly in FIGS. 1–3, a pair of parallel rail members 8 are fixedly mounted on the opposite side portions of the swivel base 6 through laterally spaced brackets 9 to form guide surfaces 7 of the U-letter shaped cross-section. The slide frame 12 is provided at its opposite sides with front and rear guide rollers 11, each rotatable about a horizontal axis. The guide rollers 11 are engaged with the guide surfaces 7 of rail members 8 to support the slide frame 12 for horizontal movement in a fore-and-aft direction. A support frame 13 is composed of a pair of spaced triangular upright plates which are fixedly mounted on the central portion of the slide frame 12 along the direction of its width.

Figure 7:
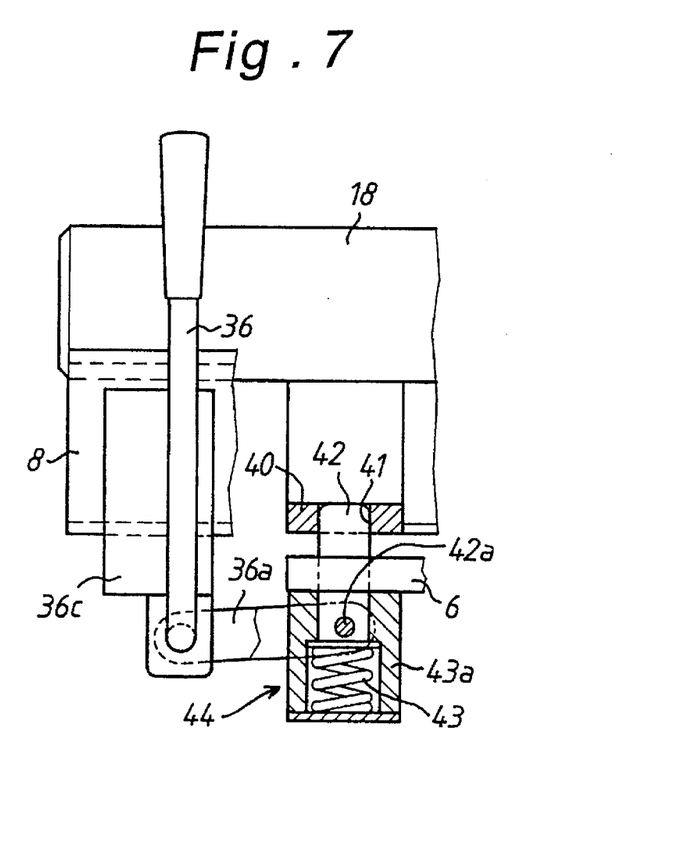
FIG. 7 is a partly broken side view of a slide locking mechanism for locking the frame to the swivel base at a forward position and a backward position.

In FIGS. 1, 2, and 7, there is illustrated a slide locking mechanism 44 for locking the slide frame 12 at the forward position and the backward position. A lock pin 42 of the slide locking mechanism 44 is vertically and slidably disposed within a cylindrical holder 43a secured to the bottom surface of swivel base 6 and loaded upwardly by a spring 43. In a free condition, the lock pin 42 is engaged at its lower end flange with an upper flange of holder 43a and projected from the swivel base 6 at its upper end. A lateral support member 36c is secured at its opposite ends to the front ends of parallel rail members 8, and a release lever 36 of the slide lock mechanism 44 is pivoted on the support member 36c so as to be rotatable about a lateral axis. The release lever 36 is provided at its distal end with a fork portion 36a which is composed of a pair of spaced plates secured thereto at the central portion of support member 36c. A connecting pin 42a crossing the lock pin 42 is engaged at its opposite ends with elongated holes 36b formed in the fork portion 36a through elongated holes 43b formed in the holder 43a. When the release lever 36 is pushed backward, the lock pin 42 is moved downward against the biasing force of spring 43.

A lock plate 38 secured to a lateral member 37 connecting the front ends of slide frame 12 is formed with a hole 39 at its central portion, while a lock plate 40 secured at its opposite ends to the front end of lift rack 18 is formed with a hole 41 at its central portion. When the slide frame 12 is moved forward or backward along the parallel rail members 8, the lock pin 42 of locking mechanism 44 is selectively engaged with the holes 39, 41 to retain the slide frame 12 in the forward or backward position. Although in the disclosed embodiment, the slide frame 12 is manually moved forward or backward, a power mechanism using a rack and a pinion or a feed screw and a nut may be adapted to move the slide frame 12. In such a case, the slide locking mechanism 44 may be eliminated.

The upright support frame 13 on the slide frame 12 is provided at its lower portion with first and second lateral support shafts 14 and 15 secured thereto parallel to each other. As shown in FIGS. 1 and 3, the first link 16 is rotatably connected at one end to the central portion of the first support shaft 14 located at a front side lower portion of support frame 13. The second link 17 is composed of a pair of spaced parallel arms which are each rotatably connected at one end to the second support shaft 15 located at a rear side upper portion of the support frame 13. The other end of the first link 16 and the other ends of the parallel arms of second link 17 are rotatably connected to third and fourth lateral support shafts 20 and 21, respectively, which are carried by a pair of spaced parallel brackets 19 secured to a rear portion of the lift rack 18. The first and second links 16 and 17 are the same in length, and the space between the first and second support shafts 14, 15 is the same as the space between the third and fourth support shafts 20, 21. With the component parts described above, there is provided a link mechanism wherein a line connecting the third and fourth support shafts 20, 21 is maintained in parallel with a line connecting the first and second support shafts 14, 15.

The seat 28 mounted on the lift rack 18 is movably supported by the link mechanism. A hydraulic actuator 25 is provided to move the seat 28 between the first position on the slide frame 12 and the second position adjacent the ground. The actuator 25 is composed of a cylinder 23 and a piston rod 24. The piston rod 24 of actuator 25 is formed at its distal end with an eye portion which is connected to a fifth lateral support shaft 26 fixed to a movable end of an arm 22. The arm 22 is secured to the one end of the first link 16 at a predetermined angle. Another eye portion of the cylinder 23 is connected to a sixth lateral support shaft 27 which is secured to an upper portion of the upright support frame 13. When the lift rack 18 and seat 28 are moved by operation of the actuator 25 between the first and second positions, the line connecting the third and fourth support shafts 20, 21 is maintained in parallel with the line connecting the first and second support shafts 14, 15 as described above. Thus, the seating surface 28a of seat 28 is maintained at an inclined angle. In the disclosed embodiment, the lift rack 18 is provided at its front portion with a foot step 29.

In addition, the actuator 25 is of the single-action type which extends only in one direction when applied with hydraulic fluid under pressure. Disposed between the lift rack 18 and support frame 13 or the first link 16 and slide frame 12 is a return spring (not shown) which is compressed during operation of the actuator 25 to accumulate energy for effective movement of the actuator 25 in a reverse direction. The cylinder 23 is connected to a source of hydraulic pressure, a valve means, and fluid reservoir through conduits (not shown).

When the seat 28 on the lift rack 18 is retained at the first position on the slide frame 12, the slide frame 12 is locked by the locking mechanism 44 in its backward position, and the swivel base 6 is locked by the locking mechanism 35 at a position facing the front of the vehicle 1. When a handicapped person intends to get in or out of the vehicle, the side door 1b of the vehicle is opened, and the release lever 30 is operated to release the locking mechanism 35. Thereafter, the swivel base 6 is rotated to move the slide frame 12, lift rack 18, and seat 28 toward the sideways position opposite the door opening 1a and to bring the lock pin 34 into engagement with the hole 32. Subsequently, the release lever 36 is operated to release the slide locking mechanism 44, and then the slide frame 12 is moved with the lift rack 18 and seat 28 to the forward position to bring the lock pin 42 into engagement with the hole 39. In such a condition, the valve means provided on the conduit connecting the cylinder 23 to the fluid reservoir is opened to discharge hydraulic fluid from the cylinder into the fluid reservoir so that the actuator 25 is shortened by the return spring. Thus, the lift rack 18 and seat 28 are pushed out from the first position until the first and second links 16, 17 are inclined forward at an angle. As a result, the lift rack 18 and seat 28 are moved forward through the door opening 1a and lowered by their own weight. In this instance, the descending speed of the lift rack 18 is controlled by a restriction means provided within the valve means or an appropriate throttle disposed in series with the valve means. When the lift rack 18 and seat 28 are lowered below a step portion 3a of the compartment floor 3 and placed at the second position adjacent the ground, the lift rack 18 is retained at the second position by means of a stopper (not shown). In such a condition, the handicapped person sits on the seating surface 28a of the seat 28 or stands up from the seat 28.

When it is desired to return the lift rack 18 and seat 28 into the vehicle compartment 2, the valve means is closed to supply hydraulic fluid under pressure to the cylinder 23 from the source of hydraulic pressure. Thus, the actuator 25 is extended against the return spring to lift the lift rack 18 and seat 28 through the door opening 1a and to retract them into the vehicle compartment. As a result, the lift rack 18 and seat 28 are placed in the first position on the slide frame 12 in its forward position, and the return spring is compressed by the return process of the lift rack 18. Thereafter, the release lever 36 is operated to release the locking mechanism 44 to permit backward movement of the slide frame 12. When placed in the backward position, the slide frame 12 is locked by the locking mechanism 44. Subsequently, the locking mechanism 35 is released to permit rotation of the swivel base 6. When rotated and placed at the forward-facing position, the swivel base 6 is locked by the locking mechanism 35 so that the seat lift mechanism is returned to the initial condition. When the slide frame 12 is placed in the backward position as described above, the lock pin 42 is engaged with the hole 41 of lateral plate 40 fixed to the lift rack 18 to retain the lift rack 18 and seat 28 in the backward position without causing movement between the first and second positions on the slide frame 12.

With the present invention described above, the seat is lowered to a position adjacent the ground through the door opening of the vehicle. Accordingly, an aged or handicapped person can easily sit on the seat or stand up therefrom, and get in or out of the vehicle compartment in a condition where he is sitting on the seat.

Although in the above embodiment, the slide frame 12 has been mounted on the swivel base 6 through the link mechanism for movement in the fore-and-aft direction, the slide frame 12 may be fixed in place on the swivel base 6 in accordance with the structure and size of the wheeled vehicle or the seat 28.

The foregoing description is considered as only illustrative of the principles of the invention. Furthermore, since numerous modifications and changes (such as those discussed above) will readily occur to those skilled in the art, the invention should not and is not limited only to the exact construction and operation shown and described. Accordingly, all suitable modifications and equivalents may be resorted to, falling within the scope of the invention as recited in the appended claims.

What is claimed is:

1. A seat lift mechanism for an automotive vehicle, said seat lift mechanism comprising:

a stationary base fixedly mounted on a compartment floor of the vehicle;

a swivel base rotatively mounted on said stationary base, said swivel base including means for rotatively swiveling on said stationary base about a vertical axis between a forward-facing position where a front of said swivel base is oriented to a front of the vehicle and a sideways position where the front of the swivel base is oriented toward a side door opening of the vehicle;

a pair of parallel rail members fixedly mounted on said swivel base at opposite sides thereof;

a slide frame slidably supported on said rail members, said slide frame being placed at a backward position on said swivel base for horizontal movement in a predetermined distance toward a forward position when said swivel base is placed in the sideways position;

a lift rack mounted on said slide frame, said lift rack having a passenger seat thereon;

a link mechanism mounted on said slide frame behind said lift rack, said link mechanism including means for operatively connecting said lift rack to said slide frame and means for moving said lift rack and said seat between a first position on said slide frame inside the vehicle and a second position with said lift rack and said seat extending from said slide frame through the side door opening and adjacent a ground surface when said swivel base is in the sideways position oriented toward the side door opening; and actuator means, operatively connected to said link mechanism, for actuating movement of said lift rack between the first and second positions, wherein said slide frame, said lift rack, and said passenger seat are mounted to each other on said swivel base so as to rotatively swivel about the vertical axis on said swivel base such that axes of rotation of each of said slide frame, said lift rack, and said passenger seat with said swivel base are concentric with said swivel base along said vertical axis.

2. The seat lift mechanism as recited in claim 1, wherein said link mechanism comprises a first link supported on said frame at one end thereof for rotary motion about a first lateral axis and connected to said lift rack at another end thereof for rotary motion about a second lateral axis in parallel with said first axis and a second link of the same length as said first link, said second link being supported on said frame at one end thereof for rotary motion about a third lateral axis spaced from said first lateral axis in parallel therewith and connected to said lift rack at another end thereof for rotary motion about a fourth lateral axis spaced from said second lateral axis in parallel therewith.

* * * * *